United States Patent
Quere et al.

(10) Patent No.: US 10,466,483 B2
(45) Date of Patent: Nov. 5, 2019

(54) OPTICAL DEVICE ADAPTED FOR A WEARER

(71) Applicant: Essilor International, Charenton-le-Pont (FR)

(72) Inventors: Loic Quere, Charenton-le-Pont (FR); Mathieu Meynen, Charenton-le-Pont (FR); Eric Gacoin, Charenton-le-Pont (FR); Marc Reignault, Charenton-le-Pont (FR); Benoit Callier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/740,866

(22) PCT Filed: Jun. 28, 2016

(86) PCT No.: PCT/EP2016/065012
§ 371 (c)(1),
(2) Date: Dec. 29, 2017

(87) PCT Pub. No.: WO2017/001403
PCT Pub. Date: Jan. 5, 2017

(65) Prior Publication Data
US 2018/0196264 A1 Jul. 12, 2018

(30) Foreign Application Priority Data
Jul. 2, 2015 (EP) .................................. 15306084

(51) Int. Cl.
*G09G 5/00* (2006.01)
*G02B 27/01* (2006.01)
*G02C 7/08* (2006.01)

(52) U.S. Cl.
CPC ......... *G02B 27/0172* (2013.01); *G02C 7/086* (2013.01); *G02B 2027/0178* (2013.01)

(58) Field of Classification Search
CPC ...... G09G 5/00; G02B 27/01; G02B 27/0172; G02B 2027/0178; G02C 7/08; G02C 7/086
See application file for complete search history.

(56) References Cited

U.S. PATENT DOCUMENTS

2002/0030639 A1 3/2002 Shimizu et al.
2006/0136018 A1* 6/2006 Lack ..................... A61M 21/00
607/88

(Continued)

FOREIGN PATENT DOCUMENTS

JP  2004-21078 A  1/2004

OTHER PUBLICATIONS

English translation of Abstract, Claims and Detailed Descritpion of Japanese Pub. No. JP 2004-021078 A, 10 pages.*

(Continued)

*Primary Examiner* — Joe H Cheng
(74) *Attorney, Agent, or Firm* — Oblon, McClelland, Maier & Neustadt, L.L.P.

(57) ABSTRACT

An optical device adapted for a wearer includes an emitting system, a first wafer and a gap. The emitting system includes a halt conducting element configured to output a light through an exit face of the light conducting element towards an eye of the wearer. The first wafer includes an internal face facing the light conducting element. The gap is arranged between at least the exit face of the light conducting element and the wafer. The internal face of the wafer includes at least a curved surface facing the exit face and has a curvature greater than 0 D.

20 Claims, 4 Drawing Sheets

(56) References Cited

U.S. PATENT DOCUMENTS

Figure 1:
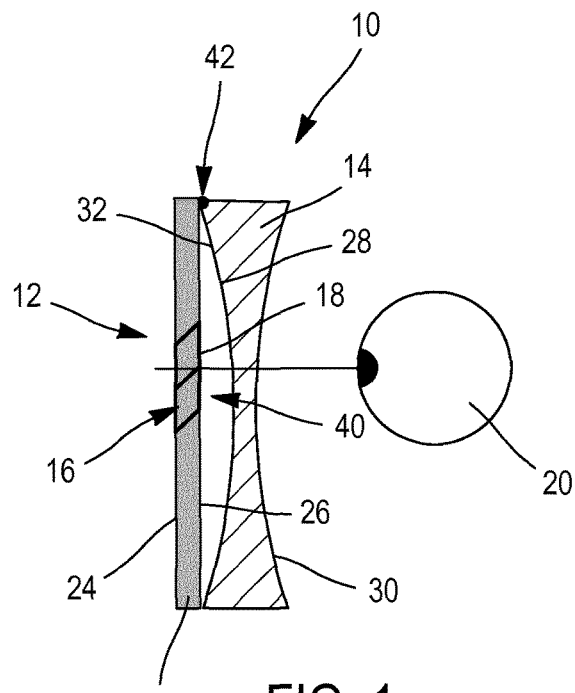

| | | | | |
|---|---|---|---|---|
| 2012/0120498 A1* | 5/2012 | Harrison | ................. | G02B 3/08 |
| | | | | 359/630 |
| 2016/0320621 A1* | 11/2016 | Biteau | ..................... | G02B 5/22 |
| 2018/0188555 A1* | 7/2018 | Quere | ..................... | G02C 1/10 |
| 2018/0275398 A1* | 9/2018 | Kikuchi | .............. | G02B 3/0056 |

OTHER PUBLICATIONS

International Search Report dated Sep. 12. 2016, in PCT/EP2016/065012 filed Jun. 28, 2016.

* cited by examiner

OPTICAL DEVICE ADAPTED FOR A WEARER

CROSS REFERENCE TO RELATED APPLICATIONS

The present application is a U.S. national stage application of International Application No. PCT/EP2016/065012, which was filed on Jun. 28, 2016 and the entire contents of which are incorporated herein by reference, which claims priority to EP 15306084.3, which was filed on Jul. 2, 2015 and the entire contents of which are incorporated herein by reference.

The invention relates to an optical device adapted to a wearer and more particularly to such optical device comprising an emitting system such as used in a head-mounted display systems.

A head-mounted system is an electro-optical device worn on the head by a wearer. Usually such system is electronically controlled so as to switch between different stages or to display information to the wearer. A head mounted system usually presents like a spectacle frame with electronically controlled spectacle lenses.

The present invention is concerned with head-mounted system used according to various usage pattern such as non immersive head-mounted system that allow the wearer to interact with their environment while using the head-mounted system or immersive head-mounted system that cuts off the field of outside view.

More particularly, the present invention is concerned with head-mounted system comprising a see-around or see-through mechanism.

Head-mounted see-through display systems are capable of superimposing information, for example computer generated information, over the real-world view. Such head-mounted see-through display systems are used in particular for realizing augmented reality.

There is a need to provide an optical device adapted to a wearer or a group of wearers, in particular adapted to their lifestyle, their visual needs and/or their requests in a simply manner, with a modular approach if necessary and preferably in a late step of the manufacturing of the optical device in order to limit the unit production cost.

In the example of a head mounted display systems, there is a need to customize such system to the wearer's viewing ability since, the wearer sees the real-world through it. If the wearer needs corrective ophthalmic lenses to see the real world correctly, the head mounted see-through system should be adapted to such requirements.

Therefore, there is a need to provide an optical device, for example a head-mounted see-through system, adapted to a wearer or a group of wearers and in particular to a wearer's prescription.

The wearer's prescription is a set of optical characteristics of optical power, of astigmatism and, where relevant, of addition, determined by an ophthalmologist in order to correct the vision defects of the wearer, for example by means of a lens positioned in front of his eye. For example, the prescription for a progressive addition lens comprises values of optical power and of astigmatism at the distance-vision point and, where appropriate, an addition value.

Therefore, it is an object of the present invention to provide an optical device comprising an emitting system adapted to a wearer visual needs, whether it is wearer's prescription or other visual needs such a light attenuation, color perception, glare protection, visual comfort improvement.

To this end, the invention proposes an optical device adapted for a wearer comprising:
- an emitting system comprising a light conducting element configured to output a light through an exit face of said light conducting element towards an eye of the wearer,
- a first wafer comprising an internal face facing the light conducting element, and
- a gap arranged between at least the exit face of the light conducting element and the first wafer, wherein the internal face of the first wafer comprises at least a curved surface facing the exit face and having a curvature greater than 0 D.

Advantageously, the optical device according to the invention allows providing a customized optical device while using generic optical system, i.e. not adapted to the specific need of each individual wearer. The optical device thus provided is compact and can be easily assembled.

Advantageously, the wafer of the optical device according to the invention can be customized for the specific need of each wearer as for ophthalmic lenses. Moreover, if the wafer is removable from the optical device, the wafer can easily be replaced by another wafer having an external surface customized according to an updated wearer data. Replacing the wafer is thus particularly easy as it does not require complex encapsulation process of the light conducting element in the wafer.

Furthermore, thanks to the gap between the light conducting element and the wafer, at least the face of the light conducting element facing the wafer does not need an optical isolation layer which is particularly yet difficult to be provided.

According to further embodiments which can be considered alone or in combination:
- the internal face of the first wafer comprises at least a concave area facing the exit face and having a curvature greater than 0.2 D and preferably greater than 0.5 D;
- the gap is filled with a material having a refractive index lower than the refractive index of the light conducting element;
- the gap is filled with air;
- the optical device further comprises a second wafer arranged such that the light conducting element is placed at least partially between the first and the second wafers;
- the light conducting element comprises an optical isolation layer arranged on the face facing the second wafer, the isolation layer being in close contact with the second wafer;
- the optical device further comprises another gap arranged between at least the face opposed to the exit face of the light conducting element and the second wafer, and the second wafer comprises an internal face facing the light conducting element, the internal face of the second wafer comprising at least a curved surface facing the face opposed to the exit face and having a curvature greater than 0 D;
- one of the wafers, also called front wafer, is configured to form a plano lens, and the other of the wafers, also called back wafer, is configured to form a lens having a refractive power adapted to the wearer;
- the internal face of the back wafer comprises at least a convex area facing the exit face without contact with the light conducting element and configured to receive the light outputting from the exit face towards the eye of the wearer;

the front wafer is configured to have a cylinder equal to zero;

the light conducting element has a transparent substrate having two faces, one of the face comprising the exit face, and each wafer and the transparent substrate are each edged around a contour to the dimensions of a frame, the contour is comprised in a plan;

the internal face of the or each wafer comprises a peripheral area, the peripheral area being comprised in the same plan as the contour;

the optical device comprises sealing means arranged between a peripheral area of the transparent substrate and a peripheral area of the internal face of the or each wafer;

at least one of the faces of at least one wafer is surfaced according to wearer data;

the internal face of at least one wafer has a Fresnel pattern;

at least one of the wafers is made by casting, molded by injection or machined;

one of the wafers is made from transparent plastic whereas the other wafer is made from mineral material;

at least one of the wafers comprises an optical function on the external and/or internal surface and/or within the wafer, the optical function being selected from a group comprising a photochromic layer, a polarizing layer, a tinted layer and any combination thereof.

Figure 2:
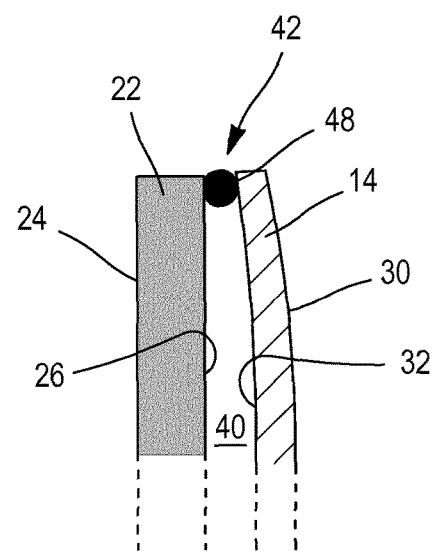
Figure 3A:
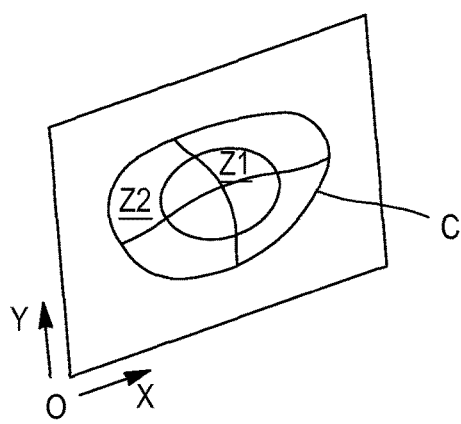
Figure 3B:
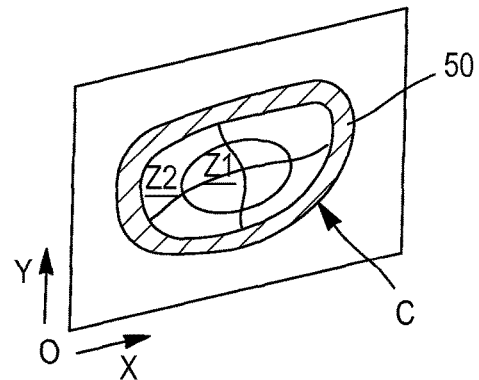
Figure 4:
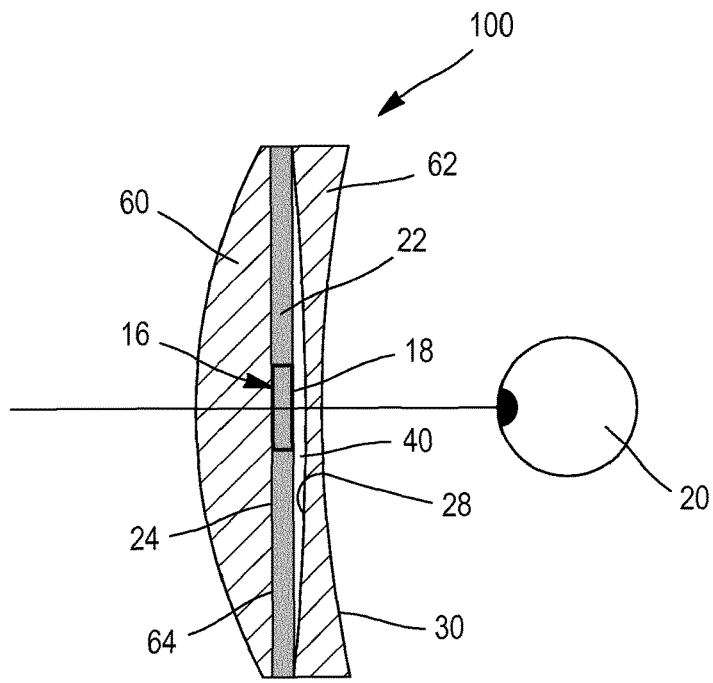
Figure 5:
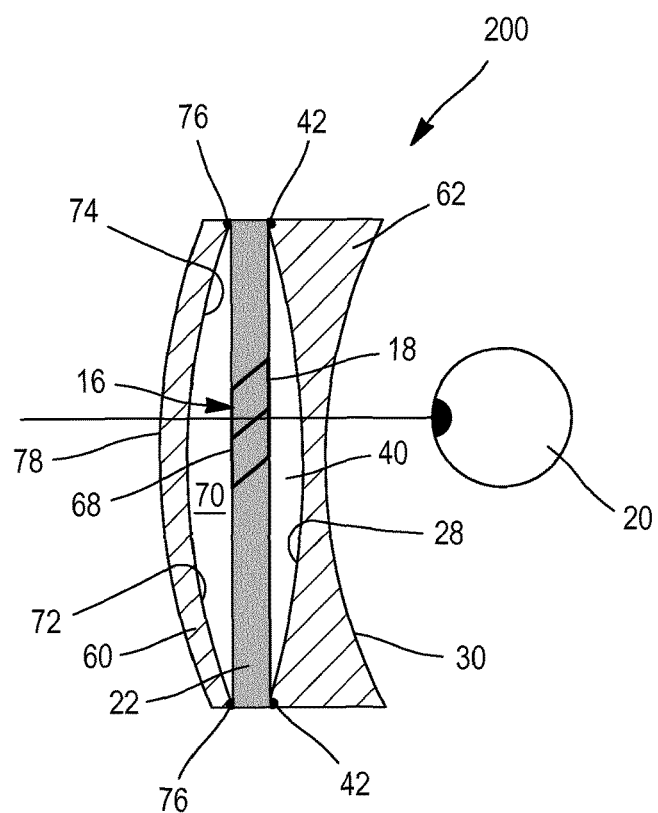
Figure 6:
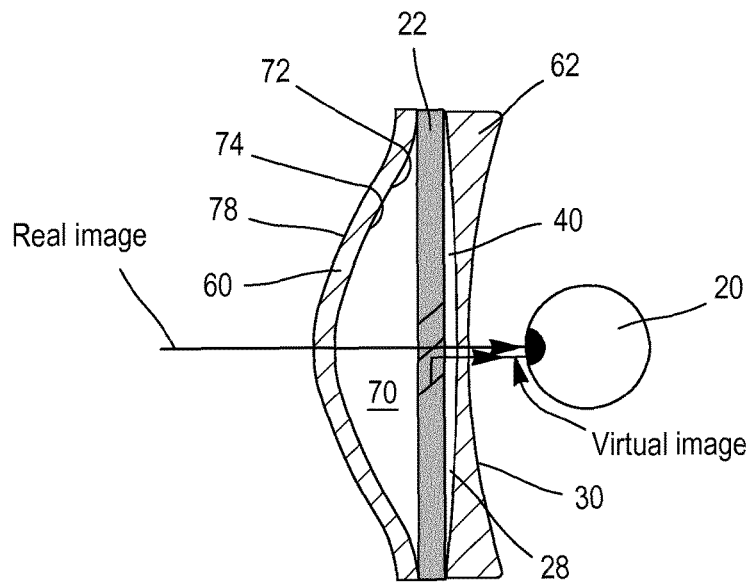
Figures 7, 8:
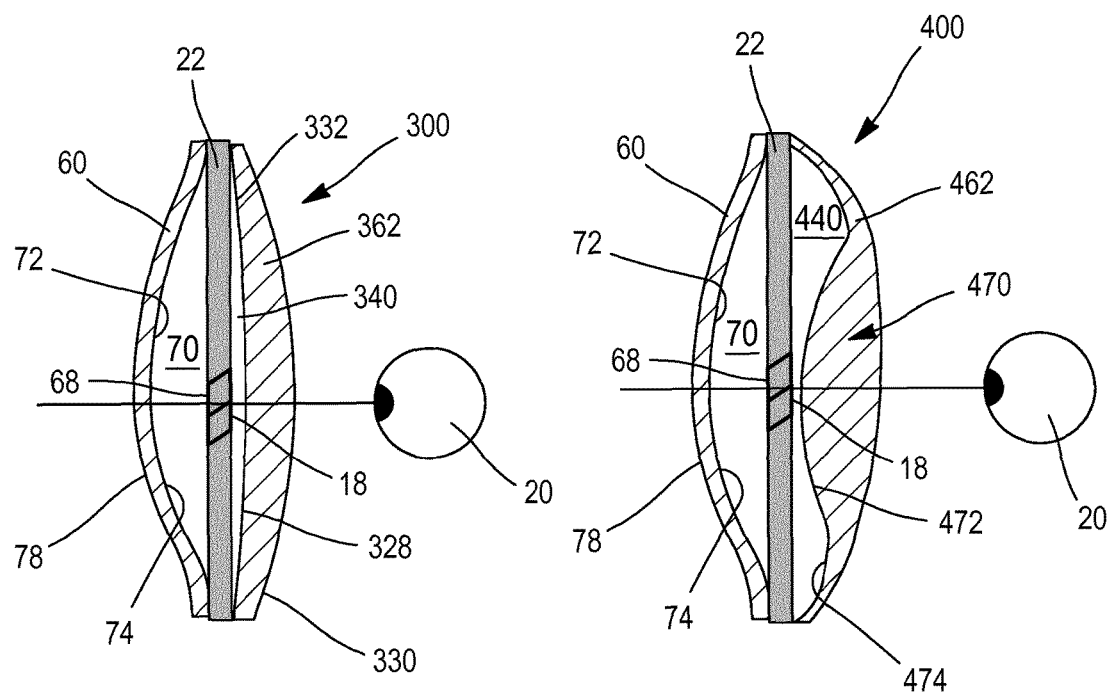
Figure 9:
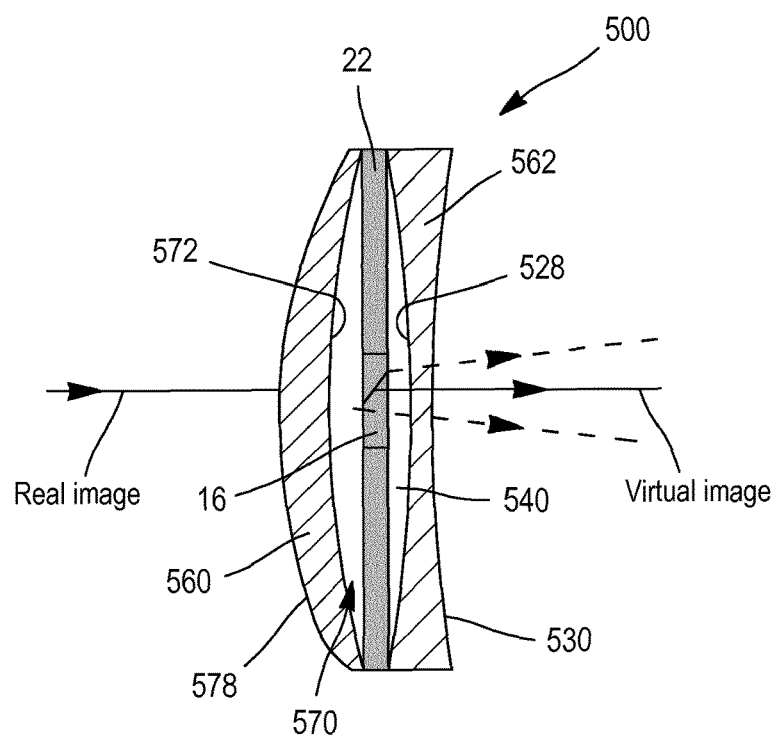
Figure 10:
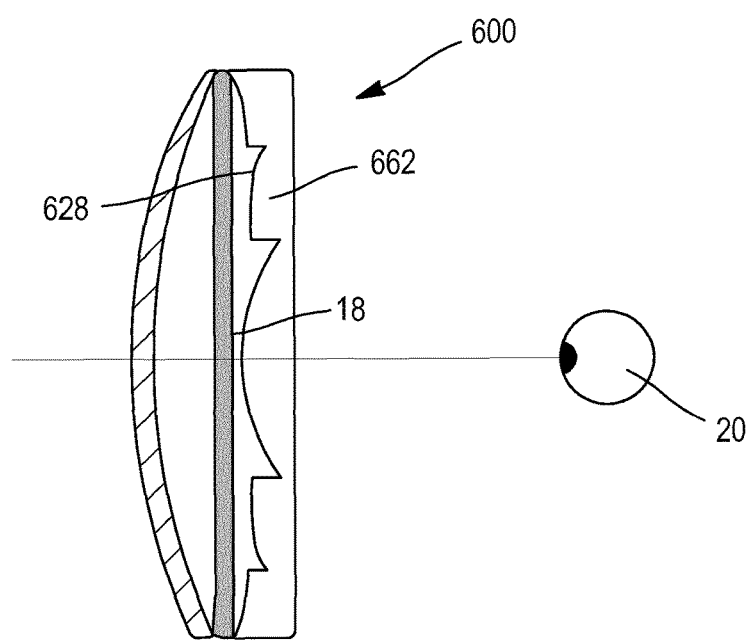

Non limiting embodiments of the invention will now be described, by way of example only, and with reference to the following drawings in which:

FIG. 1 is a sectional view of an optical device according to a first embodiment of the invention, FIG. 2 is a zoom of FIG. 1, FIGS. 3A and 3B illustrates a preferred feature of an optical device according to the invention, FIG. 4 is a sectional view of an optical device according to a second embodiment of the invention, FIG. 5 is a sectional view of an optical device according to a third embodiment of the invention, FIG. 6 is a sectional view of an optical device according to a fourth embodiment of the invention, FIG. 7 is a sectional view of an optical device according to a fifth embodiment of the invention, FIG. 8 is a sectional view of an optical device according to a sixth embodiment of the invention, FIG. 9 is a sectional view of an optical device according to a seventh embodiment of the invention, and FIG. 10 is a sectional view of an optical device according to another embodiment of the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

A sectional view of an optical device 10 adapted for a wearer according to the invention is illustrated on FIG. 1. The optical device 10 comprises at least an emitting system 12 and a first wafer 14. The emitting system can comprise a light-emitting diode (LED), a display.

Subsequently, a preferred embodiment will be detailed in which the emitting system is a display system.

The display system is arranged to display information, generally computer generated information, towards at least one eye of the wearer. For example, the display system can be arranged to surimpose information over the real world view. With such device, the viewer's image of the world is augmented with overlaying information.

The display system 12 comprises a display source (not illustrated), a collimating source (not illustrated) and a light conducting element 16. The light conducting element 16 is configured to output a supplementary light through an exit face 18 of said light conducting element towards an eye 20 of the wearer. For example, the light conducting element can be a light-guide optical element (LOE).

Such display system allows a image source to be imaged to infinity or not and reflected into the eye of the wearer.

In one embodiment, the light conducting element comprises a transparent substrate 22 having a front optical face 24 and a back optical face 26. The back optical face comprises an area corresponding to the exit face 18 of the light conducting element through which the supplementary light is configured to output towards the eye 20 of the wearer.

The light conducting element 16 can further comprise or not an optical isolation layer arranged at least on the exit face 18 of the light conducting element through which the supplementary light is configured to output towards the eye 20 of the wearer and preferably on the entire back optical face 26 of the transparent surface. Such isolation layer is configured to enable propagation of light beam by a set of reflections within the light conducting element to the exit face, at least in front of the wearer's pupil, without too much loss of brightness and image quality.

In the example shown on FIG. 1, the first wafer 14 is arranged between the light conducting element and the eye 20 of the wearer. In such configuration the wafer will be called "back wafer". Nevertheless, in a variant the first wafer can be arranged such that the light conducting element is arranged between the wafer and the eye of the wearer and thus, the wafer will be called "front wafer".

The wafer 14 comprises an internal face 28 facing the light conducting element and an external face 30 opposed to the internal face. The internal face 28 of the first wafer comprises at least a curved surface 32 facing the exit face and having a curvature greater than 0 D.

According to an embodiment, the internal face 28 of the wafer comprises at least a concave area facing the exit face and having a curvature greater than 0.2 D and preferably greater than 0.5 D. In the embodiment illustrated on FIG. 1, the front and the back optical faces 24, 26 of the transparent substrate are both plan and the entire surface of the internal surface 28 is concave and so forms the curved surface 32.

The curvature of a face of the wafer can be defined by the mean curvature, which is equal to half the sum of the principal curvatures of the face, or by the mean of the best fit of the principal curvatures of the face, or by the mean curvature of the most concave meridian of the face.

The first wafer 14 and the light conducting element 16 of the display system 12 are arranged and configured such that there is a gap 40 between at least the exit face 18 of the light conducting element 16 and the wafer 14.

Indeed, the curvature of the concave area 32 is configured to ensure the gap 40 between the exit face 18 of the light conducting element 16 and the first wafer 14. In other words, thanks to the curvature of the concave area 32, there is no contact between the wafer 14 and at least the exit face 18 of the light conducting element 16, and preferably the whole surface, despite mechanical stress (pressure, deformation resulting of the assembling of the optical device), manufacturing tolerance, risk of displacement between the light conducting element and the wafer. The applicant has determined that a minimum curvature equal to 0.2 D, and preferably 0.5 D, ensures a gap 40 between the exit face of the light conducting element and the wafer.

Preferably, the gap 40 is filled with air. Nevertheless, the gap can be filled with another material having a refractive index different from the refractive index of the light conducting element; a large difference between the refractive index being preferable.

Furthermore, the optical device comprises sealing means 42 arranged between a peripheral area 44 of the transparent substrate 22 and a peripheral area 46 of the internal face 28 of the first wafer 14 ensuring the watertightness and airtightness of the gap of the optical device.

For example, sealing means 42 can comprise a peripheral seal 48 arranged, preferably continuously, between the peripheries 44, 46 of the transparent substrate 22 and the wafer 14 as illustrated on FIG. 2. Another example to ensure watertightness and airtightness of the gap is to arrange a peripheral layer of adhesive between the peripheries of the transparent substrate 22 and the wafer 14.

The adhesive may be a glue or a pressure sensitive adhesive (PSA) or a combination of PSA and tac.

With reference to FIGS. 3A and 3B, the first wafer 14 and the transparent substrate 22 are each edged around a contour C to the dimensions of a frame. At least a majority of the contour C is comprised in a plan OXY to ensure the sealing (water/air) in a particularly simple manner allowing the support of the contour of the wafer, which is plane on at least a majority of, and preferably the entire contour C of the transparent substrate 22 embedding the light conducting element 16. Another advantage is the ability to perform a simple seal, such a flat gasket.

To be edged along the contour C comprised in the plan OXY, the first wafer has an internal surface 28 whose curvature varies accordingly. For example, the curvature is constant in a central area Z1 of the wafer and varies in a peripheral area Z2 extending around the central area from the central area Z1 to the contour C. The exit area 18 of the light conducting element 16 preferably faces the central zone Z1.

To ensure a more robust sealing between the wafer 14 and the transparent substrate 22, the internal face 28 of the wafer 14 comprises a peripheral area 50 which is comprised in the same plan OXY as the contour C as illustrated on FIG. 3B. Of course, the peripheral area 50 can be discontinuous such that it is formed by a plurality of peripheral sub-areas, each comprised in the same plan OXY and having different geometries.

Furthermore, the optical device can further comprise a second wafer arranged such that the light conducting element is placed at least partially between the first and second wafers as illustrated in FIGS. 4 to 10. In this case, one of the wafers, which is furthest from the eye of the wearer, is called front wafer 60 and the other, which is the closest to the eye, is called back wafer 62.

According to the embodiment of an optical device 100 according to the invention shown on FIG. 4, the second wafer, here the front wafer 60, can be in close contact with the transparent substrate 22 of the light conducting element 12. In such case, the light conducting element 12 preferably comprises an isolation layer 64 arranged on the front face 24 facing the front wafer 60. In this case, the isolation layer 64 is in close contact with the front wafer 60. For example, the front wafer can be glued on the isolation layer and the transparent substrate 22.

In this embodiment, the back wafer 62, and more particularly its internal surface 28, is arranged and configured such that there is a gap 40 between at least the exit face 18 of the light conducting element 16 and the internal surface of the back wafer 62.

Moreover, the back wafer and/or the front wafer may be configured to present several functions that may improve optical or/and mechanical properties of the optical system.

The functions may include one or more functions selected from the group comprising: a amplitude variation function such as a photochromic function and/or an electrochromic function, an electrofocus function, a solar protection function, a polarizing function, an anti fog function, a hard coat function (abrasion and/or scratch-resistant coating and/or an impact-resistant coating), a top coat function, anti-smudge function, an anti reflective function, an interferential layer, an anti-static function and a tinted function and any combination thereof.

In one embodiment, the back wafer and/or the front wafer may have a protective function of the optical system and especially of the light conducting element.

In another embodiment, non exclusive of the first one, the back wafer and/or the front wafer may be configured to ensure a filter function and/or to provide a corrective optical function to the wearer.

The back wafer 62 and/or the front wafer may be customized according to the wearer data. For example, the wearer data comprises the wearer prescription. The corrective optical function to be provided to the wearer is determined as for conventional ophthalmic lenses and at least one of the front and the back faces of the optical device 100 is customized so as to provide such corrective optical function. The front and the back faces of the optical device 100 are respectively the front surface of the front wafer 60 and the back surface 30 of the back wafer 62.

The wearer's prescription is a set of optical characteristics of optical power, of astigmatism and, where relevant, of addition, determined by an ophthalmologist in order to compensate/correct the vision defects of the wearer, for example by means of a lens positioned in front of his eye.

In one example, the wearer's prescription may be the prescription of an ametropic or emmetropic wearer.

Advantageously, only the back face of the optical device 100, i.e. the back surface 30 of the back wafer 62 is customized according to the wearer prescription data. Indeed, if the back wafer 62 is easily removable from the optical device 100, the back wafer can easily be replaced by another back wafer configured to ensure a gap 40 between at least the exit face 18 of the light conducting element 16 and the internal surface of the other back wafer and having a "new" back surface different from the "old" back surface of the previous back wafer. The "new" back wafer can thus be customized according to an updated wearer prescription data, if the wearer prescription has varied. Replacing the back wafer is particularly easy as it does not require complex encapsulation process of the light conducting element in the wafer and the light conducting element can be isolated only on the face in contact with the front wafer.

The front face and/or the back face may be also customized according to other wearer data than prescription data, for example preference relative to tint, transmission, reflection, need for photochromics lens, need for polarized lens and/or need for anti-reflect etc.

According to a variant of an optical device 200 according to the invention illustrated on FIG. 5, the optical device 200 comprises a front and a back wafers 60, 62 and the light conducting element comprising a transparent substrate 22 and is arranged between the front and the back wafers 60, 62.

The transparent substrate 22 has a front optical face 24 and a back optical face 26, which are both plan faces in this example. The back optical face 26 comprises an area corresponding to the exit face 18 of the light conducting element through which the light is configured to output towards the eye 20 of the wearer. The front optical face 24 comprises an area 68 corresponding to the exit face 18 of the light conducting element.

The back wafer 62 is arranged and configured to ensure a gap 40 between at least the exit face 18 of the light conducting element 16 and the internal surface 28 of the back wafer 62 as already described with reference to FIGS. 1 and 4. Thus, the internal face 28 of the back wafer comprises at least a curved surface, here a concave area 32 facing the exit face and having a curvature greater than 0 D. In the embodiment illustrated on FIG. 5, the entire surface of the internal surface 28 is concave and so forms the concave area 32.

Furthermore, the front wafer 60 is arranged and configured to ensure another gap 70 between at least the area 68 corresponding to the exit face 18 on the face opposed to the exit face of the transparent substrate 22 and the internal surface 72 of the front wafer 60. Thus, the internal face 72 of the front wafer comprises at least a curved surface, here a concave area 74, facing the face opposed to the exit face and having a curvature greater than 0 D, preferably greater than 0.2 D and more preferably greater than 0.5 D. In the embodiment illustrated on FIG. 5, the entire surface of the internal surface 72 is concave and so forms the concave area 74.

The gap 40 between the light conducting element and the back wafer will be called "back gap" and the other gap 70 between the light conducting element and the front wafer will be called "front gap".

Preferably, the front and back gaps 40, 70 are filled with air. Nevertheless, at least one of the gaps 40, 70 can be filled with another material having a refractive index lower than the refractive index of the light conducting element.

Furthermore, the optical device 200 comprises sealing means 42 arranged between a peripheral area 44 of the transparent substrate 22 and a peripheral area 46 of the internal face 28 of the back wafer ensuring the watertightness and airtightness of the gap of the optical device, as already described.

Moreover, the optical device 200 comprises another sealing means 76 arranged between a peripheral area of the transparent substrate 22 and a peripheral area of the internal face 72 of the front wafer ensuring the watertightness and airtightness of the gap of the optical device as already described for the back wafer and the transparent substrate.

In such embodiment, there is no contact between the concave area 74 of the front wafer 60 and the face 68 opposed to exit face 18 of the light conducting element. Advantageously, the light conducting element do not have an isolation layer arranged on the face facing the front wafer.

FIG. 6 illustrates an advantageously subembodiment of the optical device 200 of the FIG. 5 wherein the front wafer 60 is configured to form a plano lens and the back wafer 62 is configured to form a lens having a refractive power adapted to the wearer as illustrated on FIG. 5. For example, the back wafer is configured to form a biconcave lens.

In other words, the front wafer 60 has an internal face 72 and a face 78 opposed to the internal face and forming the front face of the optical device 200, the internal face 72 and the front face 78 having same curvature. Moreover, the back surface 30 is customized according to the wearer data.

Such subembodiment allows in the case that the optical device 200 is a see-through optical device that the real image and the virtual image are both transmitted through the back surface 30 of the optical device 200, which is the only surface of the optical device 200 customized according to the wearer data while having a front surface 78 with a curvature different from zero ensuring a good-looking while having a front surface 78 with a curvature different from zero ensuring a good-looking aesthetics.

Thus, the wearer can look simultaneously at the real and virtual images clearly, without the need to accommodate to see the virtual image as in the present see-through display systems and particularly wherein the light conducting element is encapsulated in a wafer, which poses problems for advanced presbyopic wearer.

FIG. 7 shows another embodiment of an optical device 300 according to the invention. The optical device 300 is similar to the optical device 200 of the FIG. 6 and comprises a front and a back wafers and a light conducting element having a transparent substrate 22 arranged between the front and the back wafers.

The internal face 72 and the opposed face 78 of the front wafer 60 are configured to form a plano lens. Thus, both faces have same curvature.

Moreover, the internal face 72 of the front wafer 60 has a curvature ensuring a front gap 70 between at least the area 68 corresponding to the exit face 18 of the transparent substrate 22 and the internal surface 72 of the front wafer 60.

The optical device 300 differs from the optical device 200 of the FIG. 6 at least in that the back wafer 362 is not configured to form a biconcave lens.

Indeed, the back wafer 362 has an internal face 328 facing the exit face 18 of the light conducting element 16 and a face 330 opposed to the internal face 328 forming the back face of the optical device 300.

The internal face 328 of the back wafer comprises at least a concave area 332 having a minimal curvature for ensuring a gap 340 between at least the concave area 332 and the exit face 18. In the embodiment illustrated on FIG. 7, the entire surface of the internal surface 328 is concave and so forms the concave area 332.

Furthermore, the face 330 opposed to the internal face 328 forming the back face of the optical device 300 is substantially convex.

Moreover, the back surface 330 and the internal face 328 of the back wafer are customized according to the wearer data.

Advantageously, the back wafer 362 can be configured to form a lens having a positive refractive power equal to the ametropia of a hypermetropic wearer. Indeed, such an optical device 300 provides a corrective optical function adapted to a hypermetropic wearer both the real image and the virtual image.

While the internal face 328 has the minimal curvature for ensuring the back gap 340, the back surface 330 is customized so as to provide the main part of the corrective optical function adapted to the wearer.

Another embodiment of an optical device 400 according to the invention is illustrated on FIG. 8. The optical device 400 is similar to the optical device 300 of the FIG. 7 and comprises a front and a back wafers and a light conducting element having a transparent substrate 22 arranged between the front and the back wafers.

The optical device 400 differs from the optical device 300 of the FIG. 7 at least in that the back wafer 462 comprises a central area 470 forming a biconvex lens facing the exit face 18 of the light conducting element.

Indeed, the back wafer 462 has an internal face 428 facing the exit face 18 of the light conducting element 16 and a face 430 opposed to the internal face 428 forming the back face of the optical device 400.

The internal face 428 comprises at least a convex area 472 facing the exit face without contact with the light conducting element and configured to receive the supplementary light outputting from the exit face towards the eye 20 of the wearer.

The internal face further comprises a concave area 474 extending from the convex area 472 to the periphery of the internal face and having a curvature configured to ensure a gap 440 between the convex area 472 and the exit face 18 of the light conducting element.

Such internal face, locally convex but overall concave, limits aberrations viewed by the wearer in the area facing the exit face.

FIG. 9 illustrates another embodiment of an optical device 500 according to the invention. The optical device 500 comprises a front and a back wafers 560, 562 and a light conducting element having a transparent substrate 22 arranged between the front and the back wafers 560, 562. The front and the back wafers 560, 562 are arranged and configured so as to ensure respectively a front and a back gap 570, 540 between the light conducting element 16 and the internal face 572, 528 of the front and back wafers 560, 562.

The back surface 530 of the optical device 500 is formed by the surface of the back wafer 562 opposed to the internal face 528.

The front surface 578 of the optical device 500 is formed by the surface of the front wafer 560 opposed to the internal face 572.

The front and the back wafers 560, 562 are configured to form an optical system adapted to the wearer data comprising the wearer prescription. More particularly, the front wafer is configured to form a front lens having a sphere Sf and a cylinder Cf and the back wafer is configured to form a back lens having a sphere Sb and a cylinder Cb such that the sphere S and the cylinder C of the optical device 500 are determined to provide a corrective optical function adapted to compensate/correct the vision defects of the wearer as for conventional ophthalmic lenses. According to an example, the sphere S of the optical device 500 is the sum of the sphere Sf of the front lens/wafer and the sphere Sb of the back lens/wafer and, the cylinder C of the optical device 500 is the sum of the cylinder Cf of the front lens/wafer and the cylinder Cb of the back lens/wafer.

The refractive power of the front wafer and/or the back wafer can be advantageously chosen in order to define the display distance of the virtual image.

For example, to have a display distance equal to 1 m, the front wafer should have a positive refractive power equal to 1 D. A front wafer having a positive refractive power equal to 0.5 D define a display distance equal to 2 m.

For an emmetropic wearer, the front wafer 560 and the back wafer 562 have opposed refractive powers in order to have a null optical correction, but the refractive powers are different from zero in order to define the display distance.

Advantageously, the front wafer is configured to have a cylinder substantially equal to zero ensuring that the real image and the virtual image are both corrected by same cylinder Cb. In the sense of the invention, a cylinder substantially equal to zero means that the value of the cylinder is less than or equal to 0.12 D.

According to the invention, the corrective optical function to be provided to the wearer is determined as for conventional ophthalmic lenses and at least one of the front and the back faces of the optical device 500 is customized so as to provide such corrective optical function.

Other embodiments of an optical device according to the invention can be possible. Indeed, several geometries for the internal face of a wafer according to the invention are possible. In the sense of the invention, a wafer according to the invention is a wafer comprising an internal face facing the light conducting element, configured to ensure a gap between at least the exit face of the light conducting element and the wafer, and whose internal face comprises at least a curved surface having a curvature greater than 0 D and preferably a concave area facing the exit face and having a curvature greater than 0.2 D and preferably greater than 0.5 D. Thus, the internal face can be aspherical or discontinuous.

FIG. 10 illustrates an optical device 600 according to the invention wherein the internal face 628 of a back wafer 662 has a Fresnel pattern. The internal face 628 thus comprises several convex areas with a central several area facing the exit area 18 of the light conducting element without contact with the light conducting element and configured to receive the supplementary light outputting from the exit face towards the eye 20 of the wearer.

The internal face 628 is substantially overall concave to ensure a gap 640 between the convex areas and the exit face 18 of the light conducting element.

Such an optical device is very useful for high hypermetropic wearer ensuring clear virtual and real images.

Of course only the internal face of a front wafer can have a Fresnel pattern or the internal faces of both front and back wafers.

According to the invention, the wafer or each wafer is made from transparent plastic and/or from mineral material. According to an embodiment, one of the wafers is made from transparent plastic whereas the other wafer is made from mineral material.

Furthermore, at least one of the wafers is made by casting, molded by injection or machined and at least one the faces of the wafers is surfaced according to wearer data as already described.

Moreover, at least one of the wafers comprises a function on the external and/or internal surface and/or within the wafer that may improve optical or/and mechanical properties of the optical system.

The function can be selected from the group comprising: a amplitude variation function such as a photochromic function and/or an electrochromic function, an electrofocus function, a solar protection function, a polarizing function, an anti fog function, a hard coat function (abrasion and/or scratch-resistant coating and/or an impact-resistant coating), a top coat function, anti-smudge function, an anti reflective function, an interferential layer, an anti-static function and a tinted function, a protective function, a filter function and any combination thereof.

With respect to the photochromic function, photochromic materials are capable of switching between a clear state to a state where they are colored. The materials change states based, on the amount and wavelength of radiation they encounter.

In non limitative examples, the photochromic function is provided by incorporating photochromic dyes into at least one wafer material as long as the material is addressed to receive UV light, into a wafer according the invention or a wafer photochromic layer coating.

In another example, the photochromic function is provided by a temporary photochromic film (or patch) that could be easily applied to and conform to the shape and curvature of the face opposed to the internal face of at least one wafer and preferably the back wafer.

In an embodiment, the temporary photochromic film may be applied to the concave face of the wafer if the wafer material is not a UV cut filter material.

Thanks to the invention, an optical device adapted for a wearer is provided, in particular to a wearer's prescription. Providing such optical device adapted to a wearer is susceptible to affect the unit production cost. The optical device according to the invention is reliable, compact and can be easily assembled.

Advantageously, if the wafer according to the invention is easily removable from the optical device, the wafer can easily be replaced by another wafer having an external surface customized according to an updated wearer data. Replacing the wafer is thus particularly easy as it does not require complex encapsulation process of the light conducting element in the wafer.

Moreover, thanks to the gap between the light conducting element and the wafer according to the invention, at least the face of the light conducting element facing the wafer does not need an isolation layer which is yet difficult to be provided.

While the foregoing examples have been described with reference preferably to a see through electro optical device, it will be appreciated that the method of the invention may be applied to non immersive or immersive electro-optical device such as head mounted display system with see-around mechanism.

While preferred embodiments of the invention have been described above, it is to be understood that variations and modifications will be apparent to those skilled in the art without departing from the scope of the invention.

The invention claimed is:

1. An optical device adapted for a wearer comprising:
a emitting system comprising a light conducting element configured to output a light through an exit face of said light conducting element towards an eye of the wearer,
a first wafer comprising an internal face facing the light conducting element, and
a gap arranged between at least the exit face of the light conducting element and the first wafer,
wherein the internal face of the first wafer comprises at least a curved surface facing the exit face and having a curvature greater than 0 D, and
wherein the internal face of the first wafer comprises at least one concave area facing the exit face and having a curvature greater than 0.2 D.

2. The optical device according to claim 1, wherein the gap is filled with a material having a refractive index lower than the refractive index of the light conducting element.

3. The optical device according to claim 1, wherein the gap is filled with air.

4. The optical device according to claim 1, further comprises a second wafer arranged such that the light conducting element is placed between the first and the second wafers.

5. The optical device according to claim 4, wherein the light conducting element comprises an isolation layer arranged on a face facing the second wafer, the isolation layer being in close contact with the second wafer.

6. The optical device according to claim 4, further comprises another gap arranged between at least a face opposed to the exit face of the light conducting element and the second wafer, and wherein the second wafer comprises an internal face facing the light conducting element, the internal face of the second wafer comprising at least a curved surface facing the face opposed to the exit face and having a curvature greater than 0 D.

7. The optical device according to claim 6, wherein:
one of the first and second wafers, also called front wafer, is configured to form a plano lens, and
the other of the first and second wafers, also called back wafer, is configured to form a lens having a refractive power adapted to the wearer.

8. The optical device according to claim 7, wherein the internal face of the back wafer comprises at least a convex area facing the exit face without contact with the light conducting element and configured to receive the light outputting from the exit face towards the eye of the wearer.

9. The optical device according to claim 7, wherein the front wafer is configured to have a cylinder equal to zero.

10. The optical device according to claim 4, wherein:
the light conducting element has a transparent substrate having two faces, one of the faces comprising the exit face, and
the first wafer, the second wafer and the transparent substrate are each edged around a contour to dimensions of a frame, each contour is comprised in a plan.

11. The optical device according to claim 10, wherein the internal face of each of the first wafer and the second wafer comprises a peripheral area, the peripheral area being comprised in the same plan as the contour.

12. The optical device according claim 10, wherein the optical device comprises sealing means arranged between a peripheral area of the transparent substrate and a peripheral area of the internal face of each of the first wafer and the second wafer.

13. The optical device according to claim 10, wherein each of the first wafer and the second wafer has at least one face that is surfaced according to wearer data.

14. The optical device according to claim 1, wherein:
the light conducting element has a transparent substrate having two faces, one of the faces comprising the exit face, and
the first wafer and the transparent substrate are each edged around a contour to dimensions of a frame, each contour is comprised in a plan.

15. The optical device according to claim 14, wherein the internal face of the first wafer comprises a peripheral area, the peripheral area being comprised in the same plan as the contour.

16. The optical device according claim 14, wherein the optical device comprises sealing means arranged between a peripheral area of the transparent substrate and a peripheral area of the internal face of the first wafer.

17. The optical device according to claim 14, wherein the first wafer has at least one face that is surfaced according to wearer data.

18. The optical device according to claim 1, wherein the first wafer comprises an optical function on an external surface, an internal surface, or within the first wafer, the optical function being selected from a group comprising a photochromic function, a polarizing function, a tinted function and any combination thereof.

19. The optical device according to claim 1, wherein the at least one concave area has a curvature greater than 0.5 D.

20. An optical device adapted for a wearer comprising:
a emitting system comprising a light conducting element configured to output a light through an exit face of said light conducting element towards an eye of the wearer,
a first wafer comprising an internal face facing the light conducting element, a second wafer arranged such that the light conducting element is placed between the first and the second wafers, a gap arranged between at least the exit face of the light conducting element and the first wafer, and another gap arranged between at least a face opposed to the exit face of the light conducting element and the second wafer, wherein the internal face of the first wafer comprises at least a curved surface facing the exit face and having a curvature greater than 0 D, wherein the second wafer comprises an internal face facing the light conducting element, the internal face of the second wafer comprising at least an curved surface facing the face opposed to the exit face and having a curvature greater than 0 D, wherein one of the first and second wafers, also called front wafer, is configured to form a plano lens, and the other of the first and second wafers, also called back wafer, is configured to form a lens having a refractive power adapted to the wearer, and wherein the front wafer is configured to have a cylinder equal to zero.

* * * * *